(12) United States Patent
Tian

(10) Patent No.: US 11,706,172 B2
(45) Date of Patent: Jul. 18, 2023

(54) METHOD AND DEVICE FOR SENDING INFORMATION

(71) Applicant: Baidu Online Network Technology (Beijing) Co., Ltd., Beijing (CN)

(72) Inventor: Fei Tian, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 90 days.

(21) Appl. No.: 17/118,588

(22) Filed: Dec. 10, 2020

(65) Prior Publication Data

US 2021/0097262 A1   Apr. 1, 2021

Related U.S. Application Data

(63) Continuation of application No. PCT/CN2019/113903, filed on Oct. 29, 2019.

(30) Foreign Application Priority Data

Mar. 8, 2019   (CN) .......................... 201910175581.5

(51) Int. Cl.
*G06V 40/16*   (2022.01)
*G06V 10/764*   (2022.01)
(Continued)

(52) U.S. Cl.
CPC .............. *H04L 51/10* (2013.01); *G06N 3/02* (2013.01); *G06V 10/764* (2022.01); *G06V 10/82* (2022.01);
(Continued)

(58) Field of Classification Search
CPC .. G06V 40/172; G06V 40/164; G06V 40/174; G06V 10/82; G06N 3/02;
(Continued)

(56) References Cited

U.S. PATENT DOCUMENTS 10,209,782 B2 *  2/2019  Li ........................ G06F 40/30
10,706,271 B2 *  7/2020  Bryant, III ............. H04L 51/04
(Continued)

FOREIGN PATENT DOCUMENTS

CN   104076944 A   10/2014
CN   104866116 A   8/2015
(Continued)

OTHER PUBLICATIONS

International Search Report (ISR) dated Jan. 10, 2020 in related International Application No. PCT/CN2019/113903 (eight pages).

*Primary Examiner* — Wesley J Tucker
(74) *Attorney, Agent, or Firm* — Kilpatrick Townsend & Stockton LLP

(57) ABSTRACT

Disclosed in the embodiments of the present disclose are a method and device for sending information. A particular embodiment of the method comprises: acquiring user input information input to a user terminal; determining, from a target expression image set, at least one expression image to be sent to the user terminal and matching the user input information, and a presentation order of the at least one expression image; and sending presentation information to the user terminal in response to determining that, during a historical time period, the user terminal presents the at least one expression image according to the presentation order less than or equal to a target number of times, wherein the presentation information is for instructing the user terminal to present the at least one expression image according to the presentation order.

20 Claims, 7 Drawing Sheets

(51) Int. Cl.
*G06V 10/82* (2022.01)
*H04L 51/10* (2022.01)
*G06N 3/02* (2006.01)

(52) U.S. Cl.
CPC .......... *G06V 40/164* (2022.01); *G06V 40/172* (2022.01); *G06V 40/174* (2022.01)

(58) Field of Classification Search
CPC ......... H04L 51/10; H04L 65/40; H04L 51/04; G06K 9/6271
See application file for complete search history.

(56) References Cited

U.S. PATENT DOCUMENTS

| | | | |
|---|---|---|---|
| 10,708,207 B2 * | 7/2020 | Tian | H04L 51/14 |
| 2013/0283303 A1 | 10/2013 | Moon et al. | |
| 2014/0164507 A1 * | 6/2014 | Tesch | H04L 51/10 |
| | | | 709/204 |
| 2016/0154825 A1 * | 6/2016 | Yao | G06F 16/51 |
| | | | 382/218 |
| 2017/0052946 A1 * | 2/2017 | Gu | H04L 51/046 |
| 2017/0140214 A1 * | 5/2017 | Matas | G06K 9/00 |
| 2017/0277277 A1 * | 9/2017 | Li | G06F 16/24575 |
| 2018/0115797 A1 * | 4/2018 | Wexler | G06V 10/464 |
| 2018/0275747 A1 * | 9/2018 | Campbell | G06V 40/10 |
| 2018/0335930 A1 * | 11/2018 | Scapel | G06V 40/175 |
| 2018/0336715 A1 * | 11/2018 | Rickwald | H04L 51/52 |
| 2019/0098099 A1 * | 3/2019 | Goslin | G06V 40/70 |
| 2021/0218696 A1 * | 7/2021 | Ai | H04L 51/10 |

FOREIGN PATENT DOCUMENTS

| | | |
|---|---|---|
| CN | 106021599 A | 10/2016 |
| CN | 106293738 A | 1/2017 |
| CN | 107797717 A | 3/2018 |
| CN | 108038102 A | 5/2018 |
| CN | 109873756 A | 6/2019 |
| JP | 2016-90775 A | 5/2016 |

* cited by examiner

METHOD AND DEVICE FOR SENDING INFORMATION

This patent application is a continuation of International Application No. PCT/CN2019/113903, filed on Oct. 29, 2019, which claims priority to Chinese Patent Application No. 201910175581.5, filed with the China National Intellectual Property Administration (CNIPA) on Mar. 8, 2019, the contents of which are incorporated herein by reference in their entirety.

TECHNICAL FIELD

Embodiments of the present disclosure relate to the field of computer technology, and more particularly, to a method and apparatus for sending information.

BACKGROUND

In the existing technology, the number of emoticons is large, and a user often needs to find a target emoticon in a large number of emoticons to perform operations such as sending. For the presentation of emoticons, at present, the more frequently the user uses an emoticon, the more preferentially the location of the presentation of the emoticon or the more advanced the location of the presentation of the emoticon.

SUMMARY

Embodiments of the present disclosure provide a method and apparatus for sending information.

In a first aspect, some embodiments of the present disclosure provide a method for sending information, the method includes: acquiring user input information input to a user terminal; determining, from a target expression image set, at least one expression image to be sent to the user terminal and matching the user input information, and a presentation order of the at least one expression image; and sending presentation information to the user terminal in response to determining that, during a historical time period, the user terminal presents the at least one expression image according to the presentation order less than or equal to a target number of times, where the presentation information is for instructing the user terminal to present the at least one expression image according to the presentation order.

In some embodiments, the user input information is an expression image; and the determining, from the target expression image set, at least one expression image to be sent to the user terminal and matching the user input information comprises: determining, from the target expression image set, at least one expression image to be sent to the user terminal, category of the at least one expression image being identical to the category to which the acquired expression image belongs, as the at least one expression image matching the user input information.

In some embodiments, the determining, from the target expression image set, at least one expression image to be sent to the user terminal, the category of the at least one expression image being identical to the category to which the acquired expression image belongs, comprises: determining, from the target expression image set, an expression image subset belonging to a category identical to the category to which the acquired expression image belongs; and selecting the at least one expression image to be sent to the user terminal from the expression image subset.

In some embodiments, the determining, from the target expression image set, the expression image subset belonging to the category identical to the category to which the acquired expression image belongs, comprises: inputting the acquired expression image to a pre-trained deep neural network, to obtain the category to which the acquired expression image belongs; and searching, from the target expression image set, the expression image subset belonging to the obtained category.

In some embodiments, the method further includes: updating the target expression image set in response to a preset time length having passed since a previous generation time of the target expression image set, and to generate a new target expression image set; and the determining, from the target expression image set, the at least one expression image to be sent to the user terminal and matching the user input information comprises: determining, from a target expression image set updated most recently, the at least one expression image to be sent to the user terminal and matching the user input information.

In some embodiments, the target number of times is 0.

In some embodiments, the acquiring the user input information input to the user terminal comprises: acquiring user input information that has been input to the user terminal and has not been sent to another user terminal except the user terminal.

In a second aspect, some embodiments of the present disclosure provide an apparatus for sending information, the apparatus includes: an acquisition unit, configured to acquire user input information input to a user terminal; a determination unit, configured to determine, from a target expression image set, at least one expression image to be sent to the user terminal and matching the user input information, and a presentation order of the at least one expression image; and a sending unit, configured to send presentation information to the user terminal in response to determining that, during a historical time period, the user terminal presents the at least one expression image according to the presentation order less than or equal to a target number of times, where the presentation information is for instructing the user terminal to present the at least one expression image according to the presentation order.

In some embodiments, the user input information is an expression image; and the determination unit comprises: a first determination subunit, configured to determine, from the target expression image set, at least one expression image to be sent to the user terminal, category of the at least one expression image being identical to the category to which the acquired expression image belongs, as the at least one expression image matching the user input information.

In some embodiments, the first determination subunit comprises: a determination module, configured to determine, from the target expression image set, an expression image subset belonging to a category identical to the category to which the acquired expression image belongs; and a selection module, configured to select the at least one expression image to be sent to the user terminal from the expression image subset.

In some embodiments, the determination module comprises: an input submodule, configured to input the acquired expression image to a pre-trained deep neural network, to obtain the category to which the acquired expression image belongs; and a search submodule, configured to search, from the target expression image set, the expression image subset belonging to the obtained category.

In some embodiments, the apparatus further comprises: an updating unit, configured to update the target expression image set in response to a preset time length having passed since a previous generation time of the target expression image set, and to generate a new target expression image set; and the determination unit comprises: a second determination subunit, configured to determine, from a target expression image set updated most recently, the at least one expression image to be sent to the user terminal and matching the user input information.

In some embodiments, the target number of times is 0.

In some embodiments, the acquisition unit comprises: an acquisition subunit, configured to acquire user input information that has been input to the user terminal and has not been sent to another user terminal except the user terminal.

In a third aspect, some embodiments of the present disclosure provide a server for sending information, the server includes: one or more processors; a storage apparatus storing one or more programs thereon, the one or more programs, when executed by the one or more processors, causing the one or more processors to implement the method for sending information according to any one of the embodiments described above.

In a fourth aspect, some embodiments of the present disclosure provide computer readable medium storing a computer program, where the computer program, when executed by a processor, causes the processor to implement the method for sending information according to any one of the embodiments described above.

The method and apparatus for sending information provided in embodiments of the present disclosure, by acquiring user input information input to a user terminal, then determining, from a target expression image set, at least one expression image to be sent to the user terminal and matching the user input information, and a presentation order of the at least one expression image, and finally sending presentation information to the user terminal in response to determining that, during a historical time period, the user terminal presents the at least one expression image according to the presentation order less than or equal to a target number of times, where the presentation information is for instructing the user terminal to present the at least one expression image according to the presentation order, thereby further reducing the repetition times of the expression image to be presented by the user terminal, and helping the user to quickly find an expression that has not been sent before, thereby realizing faster expression reply. In addition, the number of times the user terminal requests an expression image from the server during searching an expression image can be further reduced, thereby further reducing the occupation to network resources.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
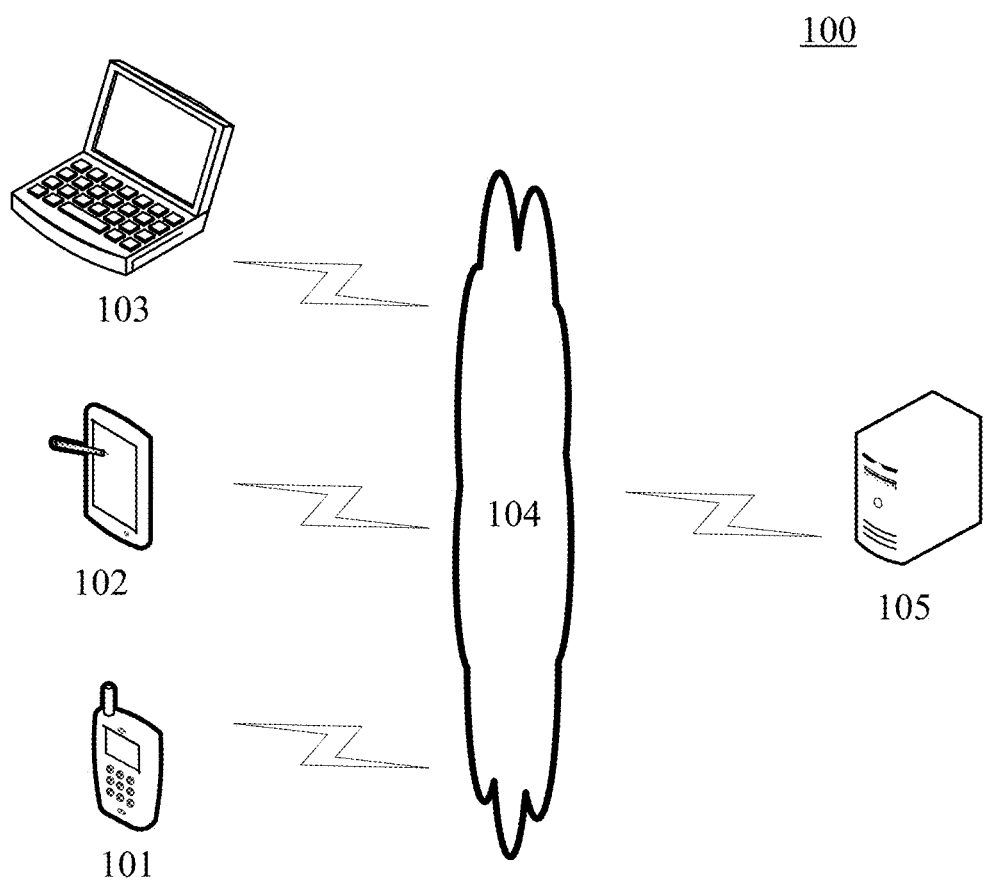
FIG. 1 is a diagram of an exemplary system architecture in which an embodiment of the present disclosure may be implemented.

FIG. 1 illustrates an exemplary system architecture 100 in which a method for sending information or an apparatus for sending information of embodiments of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may use the terminal devices 101, 102, 103 to interact with the server 105 through the network 104 to receive or send messages, or receiving an expression image or the like. Various communication client applications, such as web browser applications, shopping applications, search applications, instant messaging tools, email clients, social platform software, etc., may be installed on the terminal devices 101, 102, and 103.

The terminal devices 101, 102 and 103 may be hardware or software. When the terminal devices 101, 102 and 103 are hardware, they can be various electronic devices with display screen and support web browsing, including but not limited to smart phones, tablet computers, e-book readers, MP3 players (Moving Picture Experts Group Audio Layer III), MP4 (Moving Picture Experts Group Audio Layer IV) player, laptop and desktop computer, etc. When the terminal devices 101, 102 and 103 are software, they can be installed in the electronic devices listed above. It can be implemented into multiple software or software modules (for example, software or software modules used to provide distributed services), or a single software or software module. There is no specific limitation here.

The server 105 may be a server that provides various services, such as a backend server that performs filtering on the expression images to be displayed on the terminal devices 101, 102, and 103. The backend server may determine, from a target expression image set, at least one expression image to be sent to the user terminal and matching the user input information.

It should be noted that the method for sending information provided by embodiments of the present disclosure may be executed by the server 105, correspondingly, the apparatus for sending information may be provided in the server 105.

It should be noted that the server can be hardware or software. When the server is hardware, it can be realized as a distributed server cluster composed of multiple servers or a single server. When the server is software, it can be implemented into multiple software or software modules (for example, software or software modules used to provide distributed services), or a single software or software module. It is no limited herein.

It should be understood that the number of terminal devices, networks, and servers in FIG. 1 is only schematic. According to the implementation needs, it can have any number of terminal devices, networks and servers. When the electronic device on which the method for sending information running thereon does not require data transmission with other electronic devices, the system architecture may include only the electronic device (e.g., server 105) on which the method for sending information running thereon.

Figure 2:
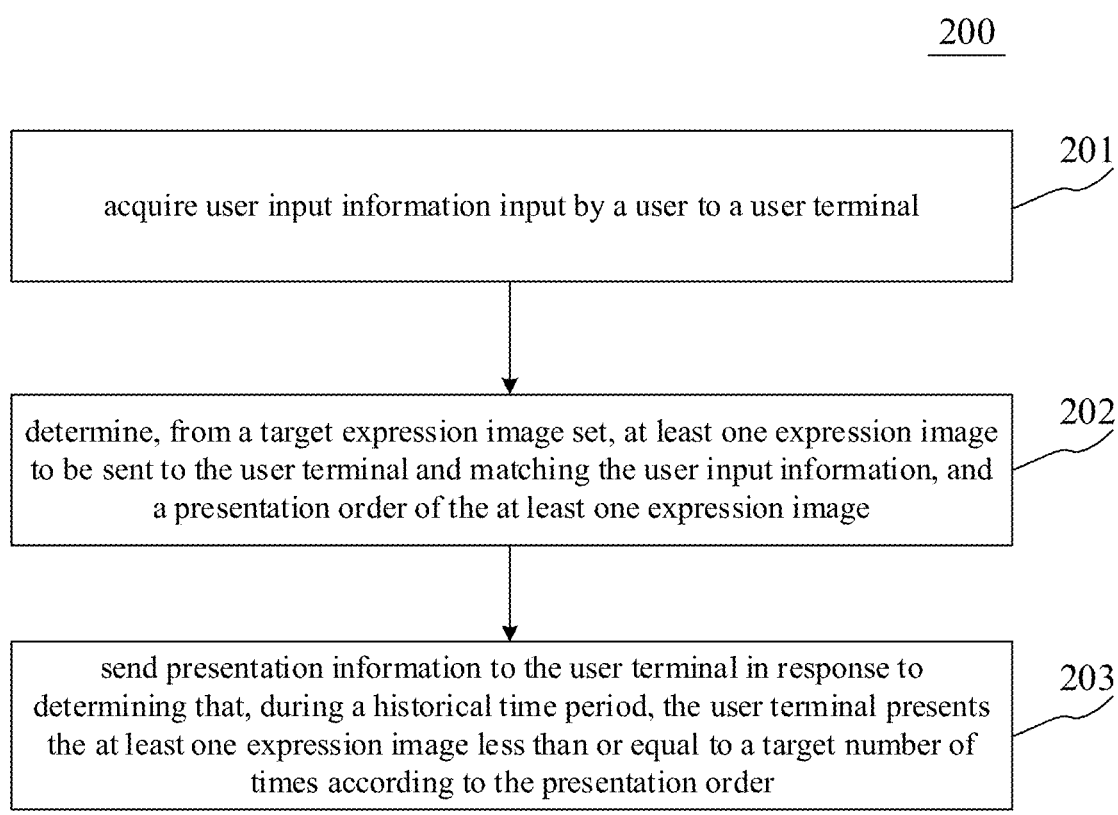
FIG. 2 is a flowchart of a method for sending information according to an embodiment of the present disclosure.

With further reference to FIG. 2, a flow 200 of a method for sending information according to an embodiment of the present disclosure is shown. The method for sending information includes the steps of:

Step 201: acquiring user input information input by a user to a user terminal.

In the present embodiment, the execution body of the method for sending information (for example, the server shown in FIG. 1) may acquire the user input information input to the user terminal from the user terminal (for example, the terminal devices 101, 102, 103 shown in FIG. 1) through a wired or a wireless connection.

The user terminal may be a terminal used by the user, and may be communicatively connected to the execution body. The user input information may be various information input by the user to the user terminal. As an example, the user input information may include, but is not limited to, at least one of text information, voice information, image information (e.g., an expression image), or the like.

Step 202: determining, from a target expression image set, at least one expression image to be sent to the user terminal and matching the user input information, and a presentation order of the at least one expression image.

In the present embodiment, the above-described execution body may determine, from the target expression image set, at least one expression image to be sent to the user terminal and matching the user input information acquired in step 201, and determine the presentation order of the at least one expression image.

Where the target expression image set may be a set of large number of expression images. As an example, the target expression image set may be a set of a predetermined number (e.g., 10000, 100000) of expression images with the highest frequency being sent by the user among all expression images on the network within a predetermined historical period (e.g., 30 days, 7 days, etc.).

The expression image matching the user input information may be an expression image including a keyword of the user input information. As an example, if the user input information is "haha", the expression image matching the user input information may be an expression image including the text "haha"; Alternatively, the expression image matching the user input information may be the expression image where the category thereof is identical to the category to which the user input information belongs. For example, the execution body may first perform emotion recognition on the user input information to determine the emotion of the user, and determine the determined emotion as the category to which the user input information belongs. Then, the execution body may determine, from the target expression image set, the expression image belonging to the category as the expression image matching the user input information.

The presentation order may be used to indicate the order in which the at least one expression image is presented on the user terminal.

Here, the execution body may determine the presentation order of the at least one expression image through a plurality of ways.

As an example, the execution body may randomly determine the presentation order of the at least one expression image, thereby instructing the user terminal to randomly present each expression image in the at least one expression image.

Alternatively, the execution body may first determine the number of times of the presentations of each of the at least one expression image on the user terminal, so as to determine an ascending or descending order of the number of times of the presentations as the presentation order of the at least one expression image.

Step 203: sending presentation information to the user terminal in response to determining that, during a historical time period, the user terminal presents the at least one expression image less than or equal to a target number of times according to the presentation order.

In the present embodiment, when it is determined that, during the historical time period, the number of times the user terminal presents the at least one expression image according to the presentation order is less than or equal to the target number of times, the execution body may send the presentation information to the user terminal. Here, the presentation information is used to instruct the user terminal to present the at least one expression image according to the presentation order determined in the above step 202. Here, the history time period may be a time period before the current time (for example, when the step 203 is started to be performed), or may be a time period within a predetermined time range before the current time (for example, within 30 days ending with the current time).

Here, the execution body or an electronic device (for example, a user terminal) communicatively connected to the execution body may record the order of the expression images presented by the user terminal before the step 203 is executed, thereby determining the number of times that, during the history time period, the user terminal presents the at least one expression image according to the presentation order.

The presentation information may be used to instruct the user terminal to present at least one expression image according to the above determined presentation order.

The target number of times may be a predetermined number of times (for example, 1 and 2), or may be a product of a value included in the history period and a predetermined value. For example, if the history time period is "30 days" and the preset value is "0.3", then the value included in the history period is "30", therefor the target number of times is "9" (9=30×0.3).

In some alternative implementations of the present embodiment, the target number of times is 0.

It can be understood that when the target number is 0, the execution body may send to the user terminal the presentation information for instructing the user terminal to present the at least one expression image according to a presentation order never adopted during the historical time period, and then the user terminal may present the at least one expression image according to a new presentation order, thereby avoiding the user terminal from repeatedly presenting the expression image, facilitating the user to find an expression never be sent previously quickly, thereby realizing faster expression reply.

Sending the presentation information to the user terminal, when the number of times that the user terminal has not presented the at least one expression image in the presentation order during the historical time period is less than or equal to the target number of times.

In some alternative implementations of the present embodiment, the user input information is an expression image. Thus, the execution body may further perform the above step 202 by determining, from the target expression image set, at least one expression image to be sent to the user terminal, category of the at least one expression image being identical to the category to which the acquired expression image belongs, as the at least one expression image matching the user input information.

As an example, if the category of the expression image acquired by the above-mentioned execution body in step 201 is "happy", the above-mentioned execution body may determine at least one expression image belonging to the category of "happy" as the at least one expression image matching the user input information. It will be appreciated that the target expression image set described above may include expression images of various categories. For example, the target expression image set may include expression images of the categories such as "happy", "sad", and "depressed".

In some alternative implementations of the present embodiment, the above-described execution body may also perform step 202 by: determining, from the target expression image set, an expression image subset belonging to a category identical to the category to which the acquired expression image belongs; and selecting the at least one expression image to be sent to the user terminal from the expression image subset.

Here, the execution body may select the at least one expression image to be sent to the user terminal from the expression image subset by a plurality of manners.

As an example, the above-described execution body may randomly select a predetermined number (e.g., 9) of expression images from the expression image subset as the expression image to be sent to the user terminal.

Alternatively, the execution body may select, from the expression image subset, an expression image whose transmission frequency (number of times the expression image being sent per unit time) is higher than a preset frequency threshold as the expression image to be sent to the user terminal.

In some alternative implementations of the present embodiment, the determining, from the target expression image set, the expression image subset belonging to the category identical to the category to which the acquired expression image belongs, includes: inputting the acquired expression image to a pre-trained deep neural network, to obtain the category to which the acquired expression image belongs; and searching, from the target expression image set, the expression image subset belonging to the obtained category.

The deep neural network may be used to determine the category to which the expression image belongs. As an example, the deep neural network may be a model obtained by training an initial deep neural network model using a machine learning method.

Here, a technician may pre-set a category of each expression image in the target expression image set, in order to facilitating searching the expression image subset belonging to the obtained category.

It should be noted that one of the prior art is to use a Generative Adversarial Networks (GAN) to generate an expression image, where the generated expression image has limited diversity and is prone to generating blurred images. In the alternative implementation, a deep neural network is used to classify the expression images, so that an expression image subset belonging to the obtained category is searched from the target expression image set, thereby helping to directly search for a clear image from the target expression image set.

In some alternative implementations of the present embodiment, the execution body may further perform the step of: updating the target expression image set in response to a preset time length having passed since a previous generation time of the target expression image set, and to generate a new target expression image set. Thus, the determining, from the target expression image set, the at least one expression image to be sent to the user terminal and matching the user input information, includes: determining, from a target expression image set updated most recently, the at least one expression image to be sent to the user terminal and matching the user input information.

Here, the above-mentioned execution body may update the expression images in the target expression image set by using a plurality of new expression images, thereby obtaining a new target expression image set.

It should be understood that the present alternative implementation may update the target expression image set, thereby further reducing the repetition times of the expression image to be presented by the user terminal, and helping the user to quickly find an expression that has not been sent before, thereby realizing faster expression reply. In addition, the number of times the user terminal requests an expression image from the server during searching an expression image can be further reduced, thereby further reducing the occupation to network resources.

In some alternative implementations of the present embodiment, acquiring the user input information input to the user terminal may include a sub-step of: acquiring user input information that has been input to the user terminal and has not been sent to another user terminal except the user terminal.

It will be appreciated that the flow of a user chatting in a chat software generally include: a first step of inputting information (i.e., user input information) into an input box, a second step of clicking the sending button to send the input information to the user terminal used by someone chatting with the user. In this alternative implementation, the user input information in the above step may be information presented in the input box, that is, information inputted before the user clicks the send button. As a result, the alternative implementation can push an expression image to the user terminal before the user sends the user input information to the user terminal indicated by someone chatting with the user, thereby improving the timeliness of image push.

Figure 3A:
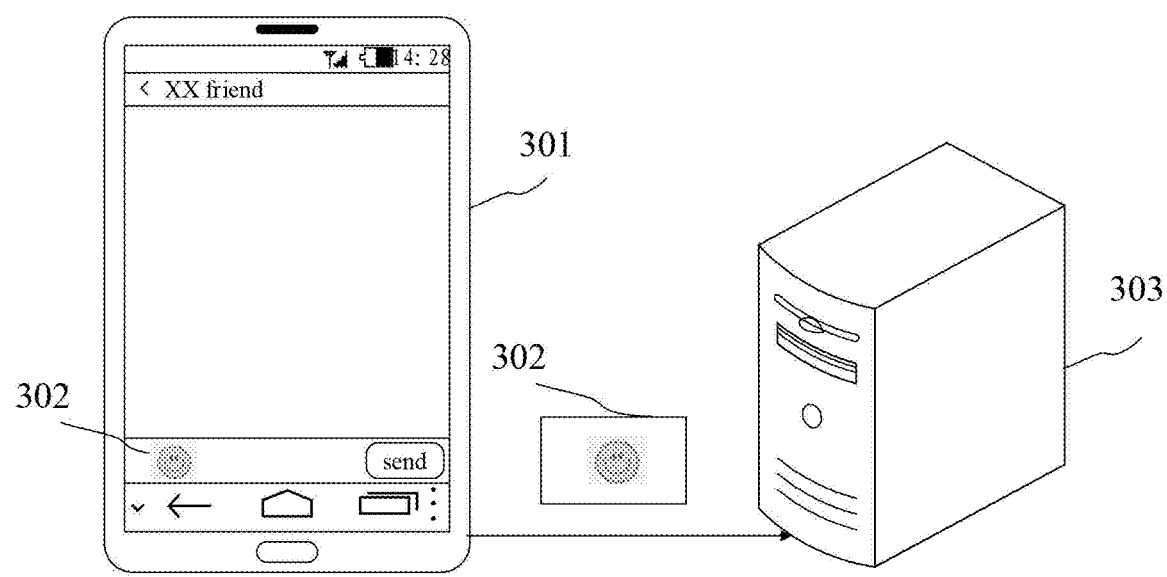
FIG. 3A-FIG. 3C are a schematic diagram of an application scenario of the method for sending information according to the present disclosure.
Figure 3B:
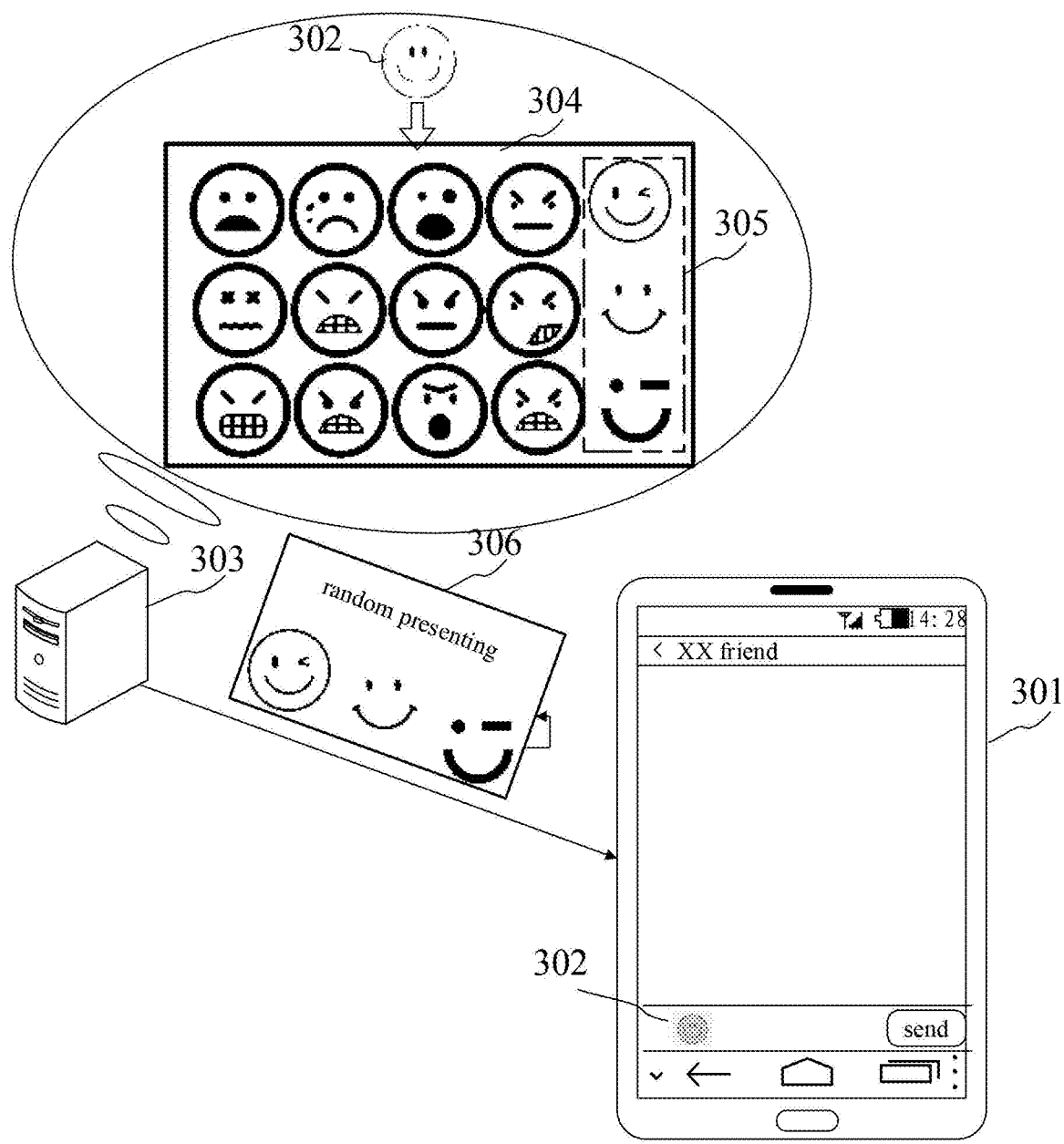
Figure 3C:
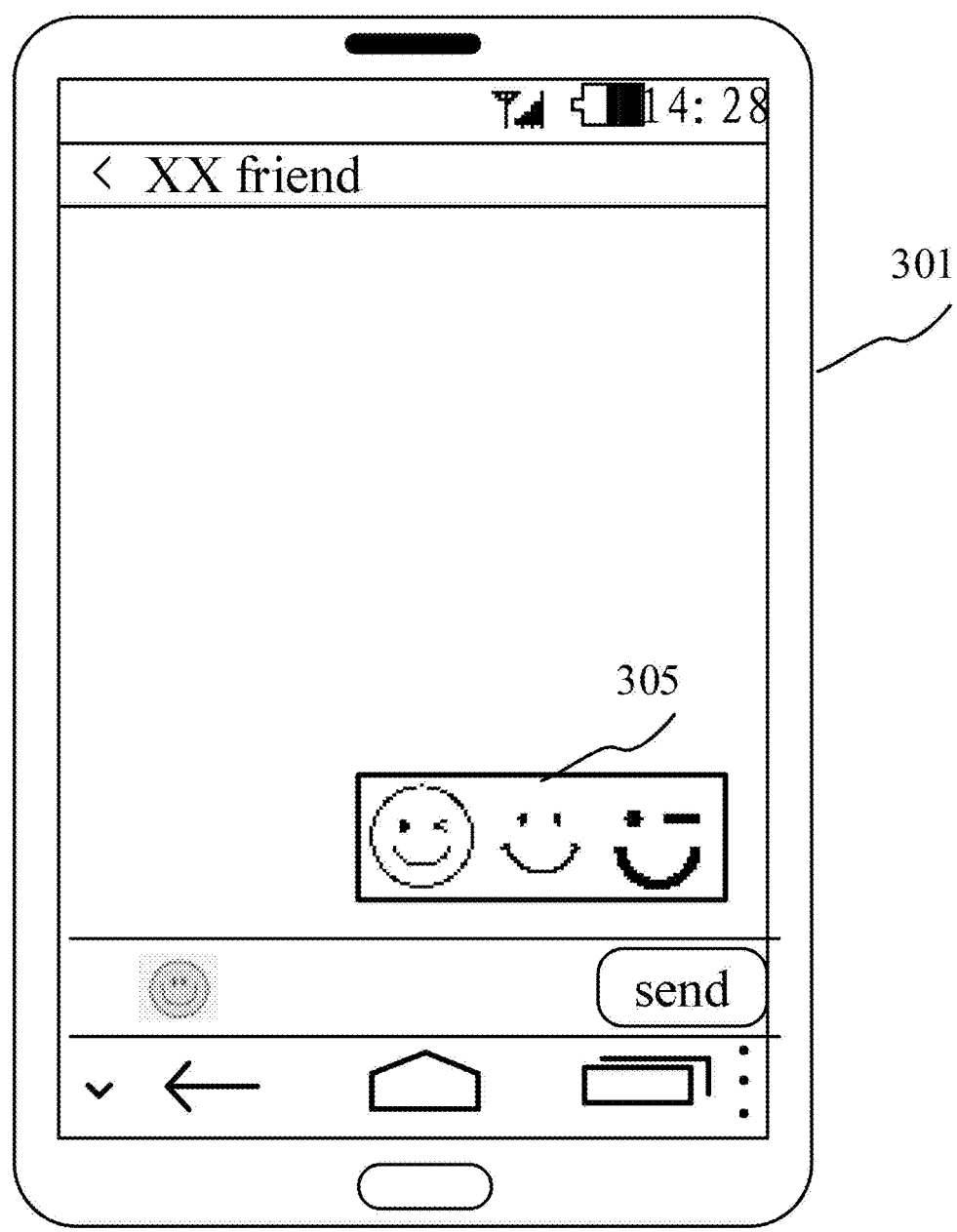

Continuing to refer to FIGS. 3A-3C, FIGS. 3A-3C are a schematic diagram of an application scenario of the method for sending information according to the present embodiment. In the application scenario of FIG. 3A, a user inputs user input information 302 (illustrated as an expression image of the category "smile") to the user terminal 301. Then, the server 303 obtains the user input information 302 from the user terminal 301. Next, referring to FIG. 3B, the server 303 determines, from the target expression image set 304, at least one expression image 305 to be sent to the user terminal 301 and matching the user input information 302, and a presentation order (e.g., a presentation order of random presentation) of the at least one expression image 305, after that the server 303 determines that, during a historical period (e.g., 30 days), the user terminal 301 presents the at least one expression image 305 according to the presentation order less than or equal to the target number of times (e.g., 10), and thus the server 303 sends the presentation information 306 to the user terminal 301. Here, the presentation information 306 is used to instruct the user terminal 301 to present the at least one expression image 305 according to the presentation order of the random presentation. Referring now to FIG. 3C, the user terminal 301 presents the at least one expression image 305 according to the presentation order of the random presentation.

Currently, in the expression image presentation scenario, one of the prior art techniques is that, when a user inputs user input information (e.g., text, expression, etc.), expression images are presented to the user in descending order of the frequencies in which the user uses the expression images. In this case, if a user wants to search for an expression image which has not been used or which has a low frequency of being used, it takes a lot of time to search. Thus, on the one hand, the time of the user is wasted, and on the other hand, the number of times the user terminal requests an expression image from the server may also be required, resulting in a large occupation to network resources. Therefore, in response to the above problem, there is a need for pushing to the user an expression image which matches the user input information input thereto and has a lower frequency of being used.

According to the method provided in the above embodiment of the present disclosure, the user input information input by the user to the user terminal is acquired, and then, from the target expression image set, at least one expression image to be sent to the user terminal and matching the user input information, and the presentation order of the at least one expression image are determined. Finally, when the user terminal presents, during the historical time period, the at least one expression image to the user terminal according to the presentation order less than or equal to the target number of times, the presentation information is sent to the user terminal, so that the user terminal presents the at least one expression image according to the presentation order, thereby reducing the repetition times of presenting the expression image by the user terminal, facilitating the user to quickly find an expression image that has not been previously sent, thereby realizing a faster expression reply. In addition, it is also possible to reduce the times of requesting an expression image from the server by the user terminal during searching for an expression image by the user terminal, thereby reducing the occupation to network resources.

Figure 4:
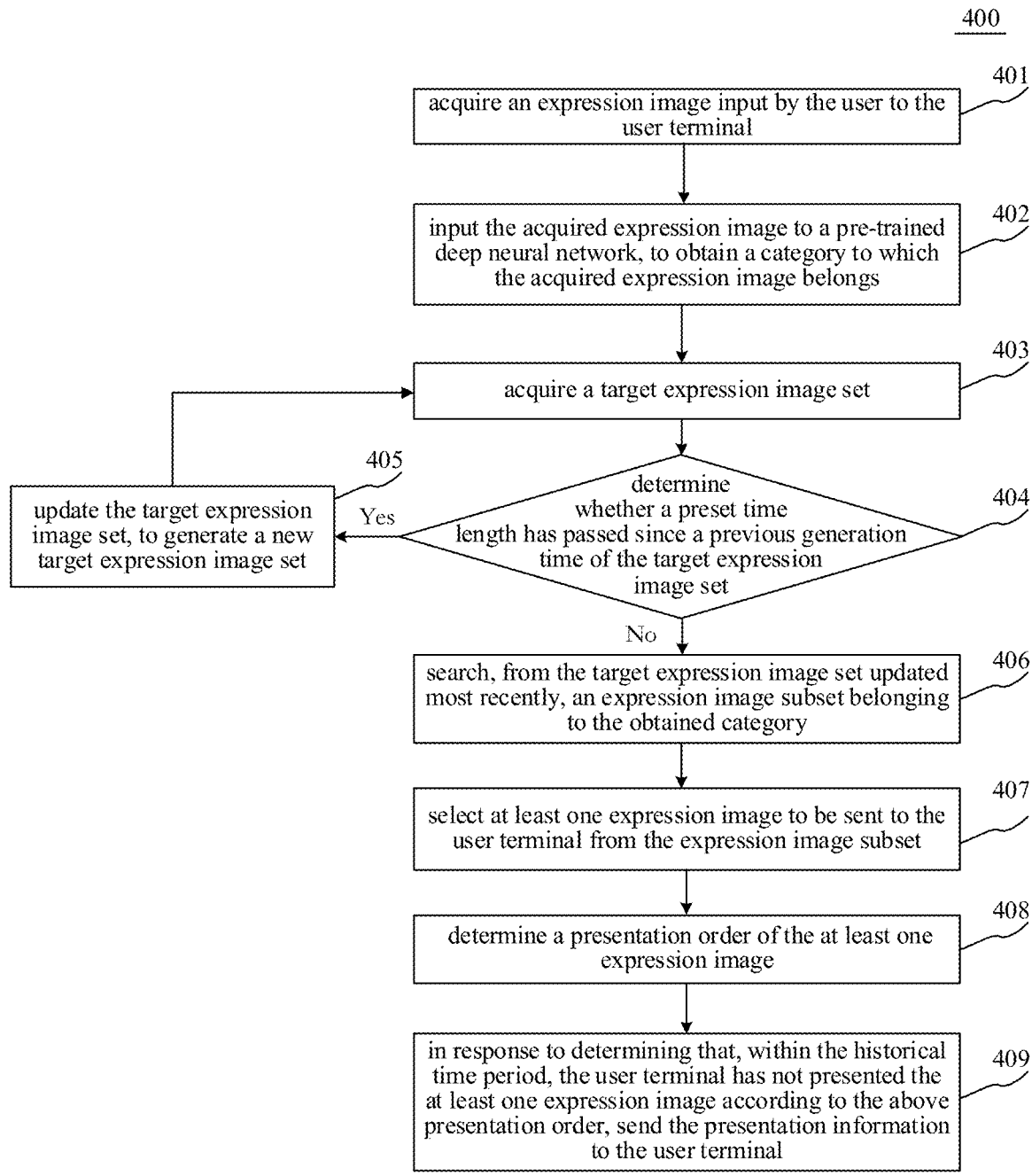
FIG. 4 is a flowchart of the method for sending information according to another embodiment of the present disclosure.

Further referring to FIG. 4, a flow 400 of a method for sending information according to another embodiment is illustrated. The flow 400 of the method for sending information includes the steps of:

Step 401: acquiring an expression image input by the user to the user terminal. Thereafter, step 402 is performed.

In the present embodiment, the execution body of the method for sending information (for example, the server shown in FIG. 1) may acquire the expression image input by the user to the user terminal from the user terminal (for example, the terminal devices 101, 102, 103 shown in FIG. 1) through a wired or wireless connection.

The user terminal may be a terminal used by the user, and may be communicatively connected to the execution body.

Step 402, inputting the acquired expression image to a pre-trained deep neural network, to obtain a category to which the acquired expression image belongs. Thereafter, step 403 is performed.

In the present embodiment, the above-described execution body may input the expression image acquired in step 401 to a pre-trained deep neural network, to obtain the category to which the acquired expression image belongs. The deep neural network may be used to determine the category to which the expression image belongs. As an example, the deep neural network may be a model obtained by training an initial deep neural network model using a machine learning method.

Step 403: acquiring a target expression image set. Thereafter, step 404 is performed.

In the present embodiment, the above-described execution body can acquire the target expression image set, where the target expression image set may include a plurality of expression images. As an example, the target expression image set may include a set of predetermined number (e.g., 10000, 100000) of expression images with the highest frequency of being sent by the user among all expression images on the network within a predetermined historical period (e.g., 30 days, 7 days, etc.).

Step 404, determining whether a preset time length has passed since a previous generation time of the target expression image set. Thereafter, if yes, step 405 is performed; If not, step 406 is performed.

In the present embodiment, the above-described execution body can determine whether or not a predetermined time elapses from the last generation time of the target expression image set.

Step 405, updating the target expression image set to generate a new target expression image set. Thereafter, step 403 is performed.

In this embodiment, the execution body may also update the target expression image set to generate a new target expression image set.

It will be appreciated that after acquiring the target expression image set, the target expression image set may be updated at an interval of a preset time interval.

Step 406, searching, from the target expression image set updated most recently, an expression image subset belonging to the obtained category. Thereafter, step 407 is performed.

In the present embodiment, the above-mentioned execution body can search for a subset of expression images belonging to the obtained category from the target expression image set updated most recently.

Here, a technician may pre-set a category of each expression image in the target expression image set, in order to facilitating the searching for an expression image subset belonging to the obtained category.

Step 407: selecting at least one expression image to be sent to the user terminal from the expression image subset. Thereafter, step 408 is performed.

In the present embodiment, the above-described execution body may select at least one expression image to be sent to the user terminal from the expression image subset.

Here, the execution body may select at least one expression image to be sent to the user terminal from the expression image subset by a plurality of manners.

As an example, the above-described execution body may randomly select a predetermined number (e.g., 9) of expression images from the expression image subset as the expression image to be sent to the user terminal.

Alternatively, the execution body may select, from the expression image subset, an expression image whose transmission frequency is higher than a preset frequency threshold as the expression image to be sent to the user terminal.

Step 408, determining a presentation order of the at least one expression image. Thereafter, step 409 is performed.

In the present embodiment, the above-described execution body may determine the presentation order of the at least one expression image, where the presentation order may be used to indicate the order in which the at least one expression image is to be presented by the user terminal.

Here, the execution body may determine the presentation order of the at least one expression image by a plurality of ways.

As an example, the execution body may randomly determine the presentation order of the at least one expression image, thereby randomly presenting the expression images of the at least one expression image.

Alternatively, the execution body may first determine the number of times of the presentations of each of the at least one expression image on the user terminal, so as to determine an ascending or descending order of the number of times of the presentations as the presentation order of the at least one expression image.

Step 409, in response to determining that, within the historical time period, the user terminal has not presented the at least one expression image according to the above presentation order, sending the presentation information to the user terminal.

In the present embodiment, the execution body may send the presentation information to the user terminal when it is determined that, within the historical time period, the user terminal has not presented the at least one expression image according to the presentation order, where the presentation information is used to instruct the user terminal to present the at least one expression image according to the above determined presentation order.

It should be noted that, in addition to the above-described contents, the above-described step 401-step 409 may further include the same features as those of the embodiments corresponding to FIG. 2 and the alternative implementation thereof, and produce same effects, and details are not described herein.

As can be seen from FIG. 4, compared with the corresponding embodiment of FIG. 2, the flow 400 of the method for sending information in the present embodiment highlights the step of using a deep neural network to determine, in the expression image library (i.e., the target expression image set described above), the expression image to be sent to the user terminal and matching the expression image input by the user. In the prior art, a Generative Adversarial Networks (GAN) is generally used to generate an expression image, where the generated expression image has limited diversity and is prone to generating blurred images. In this alternative implementation, a deep neural network is used to classify the expression images, so that an expression image subset belonging to an obtained category is searched from the target expression image set, thereby helping to directly find a clear image from the target expression image set, and then send the clear image to the user terminal.

Figure 5:
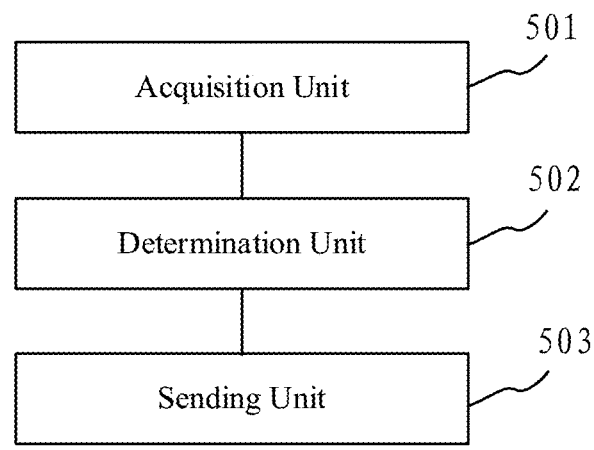
FIG. 5 is a schematic structural diagram of an apparatus for sending information according to an embodiment of the present disclosure.

Further referring to FIG. 5, as an implementation of the above method illustrated in the above Figures, an embodiment of the present disclosure provide an apparatus for sending information, the apparatus embodiment is corresponding to the method embodiment illustrated in FIG. 2. Except the features described below, the apparatus embodiment may further include features identical or corresponding to that of the method embodiment illustrated in FIG. 2. The apparatus specifically may be applied in various electronic device.

As shown in FIG. 5, the apparatus for sending information in the embodiment may include: an acquisition unit 501, a determination unit 502 and a sending unit 503. The acquisition unit 501 is configured to acquire user input information input to a user terminal; the determination unit 502 is configured to determine, from a target expression image set, at least one expression image to be sent to the user terminal and matching the user input information, and a presentation order of the at least one expression image; the sending unit 503 is configured to send presentation information to the user terminal in response to determining that, during a historical time period, the user terminal presents the at least one expression image according to the presentation order less than or equal to a target number of times, where the presentation information is for instructing the user terminal to present the at least one expression image according to the presentation order.

In the present embodiment, the acquisition unit 501 of the apparatus 500 for sending information may acquire the user input information input to a user terminal (for example, the terminal devices 101, 102 and 103 shown in FIG. 1) through wired or wireless connection.

The user terminal may be a terminal used by the user, and may be communicatively connected to the execution body. The user input information may be various information input by the user to the user terminal. As an example, the user input information may include, but is not limited to, at least one of text information, voice information, image information (e.g., an expression image), or the like.

In the present embodiment, based on the user input information acquired by the acquisition unit 501, the determination unit may determine, from the target expression image set, at least one expression image to be sent to the user terminal and matching the user input information, and the presentation order of the at least one expression image.

Where the target expression image set may be a set of large number of expression images. As an example, the target expression image set may be a set of a predetermined number (e.g., 10000, 100000) of expression images with the highest frequency being sent by the user among all expression images on the network within a predetermined historical period (e.g., 30 days, 7 days, etc.).

In the present embodiment, when it is determined that, during a historical time period, the number of times the user terminal presents the at least one expression image according to the presentation order is less than or equal to the target number of times, the sending unit may send the presentation information to the user terminal. Here, the presentation information is used to instruct the user terminal to present the at least one expression image according to the presentation order determined in the above step 202. Here, the history time period may be a time period before the current time (for example, when the step 203 is started to be performed), or may be a time period within a predetermined time range before the current time (for example, within 30 days ending with the current time).

In some alternative implementations of the present embodiment, the user input information is an expression image; and the determination unit comprises: a first determination subunit (not shown in the Figures), configured to determine, from the target expression image set, at least one expression image to be sent to the user terminal, category of the at least one expression image being identical to the category to which the acquired expression image belongs, as the at least one expression image matching the user input information.

In some alternatively implementations of the present disclosure, the first determination subunit comprises: a determination module (not shown in the Figures), configured to determine, from the target expression image set, an expression image subset belonging to a category identical to the category to which the acquired expression image belongs; and a selection module (not shown in the Figures), configured to select the at least one expression image to be sent to the user terminal from the expression image subset.

In some alternatively implementations of the present disclosure, the determination module comprises: an input submodule (not shown in the Figures), configured to input the acquired expression image to a pre-trained deep neural network, to obtain the category to which the acquired expression image belongs; and a search submodule, configured to search, from the target expression image set, the expression image subset belonging to the obtained category.

In some alternatively implementations of the present disclosure, the apparatus 500 further comprises: an updating unit (not shown in the Figures), configured to update the target expression image set in response to a preset time length having passed since a previous generation time of the target expression image set, and to generate a new target expression image set. And the determination unit comprises: a second determination subunit (not shown in the Figures), configured to determine, from a target expression image set updated most recently, the at least one expression image to be sent to the user terminal and matching the user input information.

In some alternatively implementations of the present disclosure, the target number of times is 0.

In some alternatively implementations of the present disclosure, the acquisition unit comprises: an acquisition subunit, configured to acquire user input information that has been input to the user terminal and has not been sent to another user terminal except the user terminal.

The apparatus provided in the above embodiments of the present disclosure: the acquisition unit 501 acquires the user input information inputted by the user to the user terminal; and then the determination unit 502 determine, from a target expression image set, at least one expression image to be sent to the user terminal and matching the user input information; and finally the sending unit 503 sends the presentation information to the user terminal, in response to determining that, during a historical time period, the user terminal presents the at least one expression image according to the presentation order less than or equal to a target number of times, where the presentation information is for instructing the user terminal to present the at least one expression image according to the presentation order. Thereby, the number of repetitions of an expression image to be presented by a user terminal is reduced, facilitating a user quickly finding an expression which has not been sent previously, thereby realizing quick reply of expressions. In addition, the number of times the user terminal requests an expression image from the server during searching an expression image can be further reduced, thereby further reducing the occupation to network resources.

Figure 6:
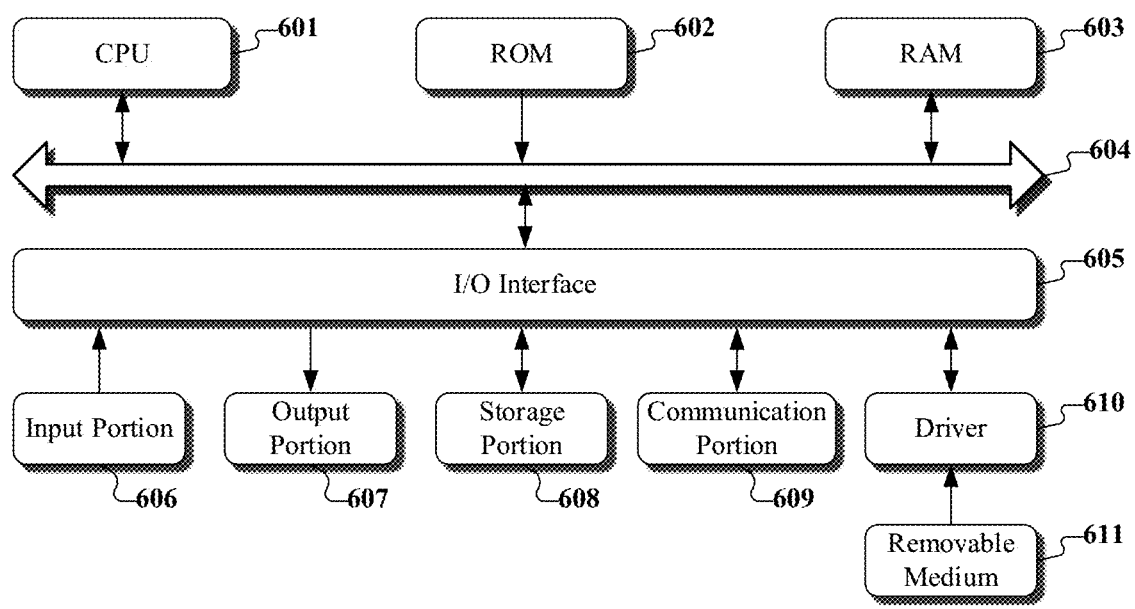
FIG. 6 is a schematic structural diagram of a computer system of an electronic device adapted to implement the embodiments of the present disclosure.

Referring to FIG. 6, a schematic structural diagram of a computer system 600 adapted to implement the computer system of a server of embodiments of the present disclosure is shown. The server shown in FIG. 6 is just an example, and should not bring any limitation to the function and usage range of embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the removeable medium 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising an acquision unit, a determination unit and a generation unit, where the names of these units or modules do not in some cases constitute a limitation to such units or modules themselves. For example, the acquisition unit may also be described as "a unit for acquiring user input information input to the user terminal by a user."

In another aspect, an embodiment of the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire user input information input to a user terminal; determine, from a target expression image set, at least one expression image to be sent to the user terminal and matching the user input information, and a presentation order of the at least one expression image; and sending presentation information to the user terminal in response to determining that, during a historical time period, the user terminal presents the at least one expression image according to the presentation order less than or equal to a target number of times, where the presentation information is for instructing the user terminal to present the at least one expression image according to the presentation order.

The above description only provides an explanation of preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in embodiments of the present disclosure are examples.

What is claimed is:

1. A method for sending information, comprising:
acquiring user input information input to a user terminal;
determining, from a target expression image set, more than one expression image to be sent to the user terminal and matching the user input information, and a presentation order of the more than one expression image; and
sending presentation information to the user terminal in response to determining that, during a historical time period, a number of times of presenting, by the user terminal, an expression sequence composed of the more than one expression image in the presentation order is less than or equal to a target number of times, for instructing the user terminal to present the more than one expression image according to the presentation order based on presentation information.

2. The method according to claim 1, wherein the user input information is an expression image; and
the determining, from the target expression image set, more than one expression image to be sent to the user terminal and matching the user input information comprises:
determining, from the target expression image set, more than one expression image to be sent to the user terminal, category of the more than one expression image being identical to the category to which the acquired expression image belongs, as the more than one expression image matching the user input information.

3. The method according to claim 2, wherein the determining, from the target expression image set, more than one expression image to be sent to the user terminal, the category of the more than one expression image being identical to the category to which the acquired expression image belongs, comprises:
determining, from the target expression image set, an expression image subset belonging to a category identical to the category to which the acquired expression image belongs; and selecting the more than one expression image to be sent to the user terminal from the expression image subset.

4. The method according to claim 3, wherein the determining, from the target expression image set, the expression image subset belonging to the category identical to the category to which the acquired expression image belongs, comprises:
inputting the acquired expression image to a pre-trained deep neural network, to obtain the category to which the acquired expression image belongs; and
searching, from the target expression image set, the expression image subset belonging to the obtained category.

5. The method according to claim 1, wherein the method further comprises:
updating the target expression image set in response to a preset time length having passed since a previous generation time of the target expression image set, and to generate a new target expression image set; and
the determining, from the target expression image set, the more than one expression image to be sent to the user terminal and matching the user input information comprises:
determining, from a target expression image set updated most recently, the more than one expression image to be sent to the user terminal and matching the user input information.

6. The method according to claim 1, wherein sending presentation information to the user terminal in response to determining that, during a historical time period, a number of times of presenting, by the user terminal, an expression sequence composed of the more than one expression image in the presentation order is less than or equal to a target number of times comprises:
in response to determining that, within the historical time period, the user terminal has not presented the expression sequence composed of the more than one expression image in the presentation order, sending the presentation information to the user terminal.

7. The method according to claim 1, wherein the acquiring the user input information input to the user terminal comprises:
acquiring user input information that has been input to the user terminal and has not been sent to another user terminal except the user terminal.

8. A server comprising:
one or more processors;
a storage apparatus storing one or more programs thereon, the one or more programs, where executed by the one or more processors, causing the one or more processors to implement operations, the operations comprise:
acquiring user input information input to a user terminal;
determining, from a target expression image set, more than one expression image to be sent to the user terminal and matching the user input information, and a presentation order of the more than one expression image; and
sending presentation information to the user terminal in response to determining that, during a historical time period, a number of times of presenting, by the user terminal, an expression sequence composed of the more than one expression image in the presentation order is less than or equal to a target number of times, wherein the presentation information is for instructing the user terminal to present the more than one expression image according to the presentation order based on presentation information.

9. The server according to claim 8, wherein the user input information is an expression image; and
the determining, from the target expression image set, more than one expression image to be sent to the user terminal and matching the user input information comprises:
determining, from the target expression image set, more than one expression image to be sent to the user terminal, category of the more than one expression image being identical to the category to which the acquired expression image belongs, as the more than one expression image matching the user input information.

10. The server according to claim 9, wherein the determining, from the target expression image set, more than one expression image to be sent to the user terminal, the category of the more than one expression image being identical to the category to which the acquired expression image belongs, comprises:
determining, from the target expression image set, an expression image subset belonging to a category identical to the category to which the acquired expression image belongs; and
selecting the more than one expression image to be sent to the user terminal from the expression image subset.

11. The server according to claim 10, wherein the determining, from the target expression image set, the expression image subset belonging to the category identical to the category to which the acquired expression image belongs, comprises:
inputting the acquired expression image to a pre-trained deep neural network, to obtain the category to which the acquired expression image belongs; and
searching, from the target expression image set, the expression image subset belonging to the obtained category.

12. The server according to claim 8, wherein the operations further comprise:
updating the target expression image set in response to a preset time length having passed since a previous generation time of the target expression image set, and to generate a new target expression image set; and
the determining, from the target expression image set, the more than one expression image to be sent to the user terminal and matching the user input information comprises:
determining, from a target expression image set updated most recently, the more than one expression image to be sent to the user terminal and matching the user input information.

13. The server according to claim 8, wherein sending presentation information to the user terminal in response to determining that, during a historical time period, a number of times of presenting, by the user terminal, an expression sequence composed of the more than one expression image in the presentation order is less than or equal to a target number of times comprises:
in response to determining that, within the historical time period, the user terminal has not presented the expression sequence composed of the more than one expression image in the presentation order, sending the presentation information to the user terminal.

14. The server according to claim 8, wherein the acquiring the user input information input to the user terminal comprises:

acquiring user input information that has been input to the user terminal and has not been sent to another user terminal except the user terminal.

15. A non-transitory computer readable medium storing a computer program, wherein the computer program, when executed by a processor, causes the processor to implement operations, the operations comprise:
  acquiring user input information input to a user terminal;
  determining, from a target expression image set, more than one expression image to be sent to the user terminal and matching the user input information, and a presentation order of the more than one expression image; and
  sending presentation information to the user terminal in response to determining that, during a historical time period, a number of times of presenting, by the user terminal, an expression sequence composed of the more than one expression image the presentation order is less than or equal to a target number of times, wherein the presentation information is for instructing the user terminal to present the more than one expression image according to the presentation order.

16. The non-transitory computer readable medium according to claim 15, wherein the user input information is an expression image; and the determining, from the target expression image set, more than one expression image to be sent to the user terminal and matching the user input information comprises:
  determining, from the target expression image set, more than one expression image to be sent to the user terminal, category of the more than one expression image being identical to the category to which the acquired expression image belongs, as the more than one expression image matching the user input information.

17. The non-transitory computer readable medium according to claim 16, wherein the determining, from the target expression image set, more than one expression image to be sent to the user terminal, the category of the more than one expression image being identical to the category to which the acquired expression image belongs, comprises:
  determining, from the target expression image set, an expression image subset belonging to a category identical to the category to which the acquired expression image belongs; and
  selecting the more than one expression image to be sent to the user terminal from the expression image subset.

18. The non-transitory computer readable medium according to claim 17, wherein the determining, from the target expression image set, the expression image subset belonging to the category identical to the category to which the acquired expression image belongs, comprises:
  inputting the acquired expression image to a pre-trained deep neural network, to obtain the category to which the acquired expression image belongs; and
  searching, from the target expression image set, the expression image subset belonging to the obtained category.

19. The non-transitory computer readable medium according to claim 15, wherein the operations further comprise:
  updating the target expression image set in response to a preset time length having passed since a previous generation time of the target expression image set, and to generate a new target expression image set; and
  the determining, from the target expression image set, the more than one expression image to be sent to the user terminal and matching the user input information comprises:
  determining, from a target expression image set updated most recently, the more than one expression image to be sent to the user terminal and matching the user input information.

20. The non-transitory computer readable medium according to claim 15, wherein the acquiring the user input information input to the user terminal comprises:
  acquiring user input information that has been input to the user terminal and has not been sent to another user terminal except the user terminal.

* * * * *